United States Patent
Veyrac et al.

(10) Patent No.: US 12,204,012 B2
(45) Date of Patent: Jan. 21, 2025

(54) MULTIPLE-INPUT MULTIPLE-OUTPUT IMAGING RADAR SYSTEM

(71) Applicant: THALES, Courbevoie (FR)

(72) Inventors: Yoan Veyrac, Merignac (FR); Pascal Cornic, Brest (FR); Renan Le Gall, Brest (FR); Gonzague Bertin De La Hautiere, Merignac (FR)

(73) Assignee: THALES, Courbevoie (FR)

( * ) Notice: Subject to any disclaimer, the term of this patent is extended or adjusted under 35 U.S.C. 154(b) by 296 days.

(21) Appl. No.: 17/525,851

(22) Filed: Nov. 12, 2021

(65) Prior Publication Data

US 2022/0146657 A1 May 12, 2022

(30) Foreign Application Priority Data

Nov. 12, 2020 (FR) ...................... 2011577

(51) Int. Cl.
*G01S 13/42* (2006.01)
*G01S 13/02* (2006.01)
(Continued)

(52) U.S. Cl.
CPC ............ *G01S 13/426* (2013.01); *G01S 13/89* (2013.01); *G01S 13/913* (2013.01); *H01Q 3/36* (2013.01); *G01S 2013/0263* (2013.01)

(58) Field of Classification Search
CPC ...... G01S 13/426; G01S 13/89; G01S 13/913; G01S 2013/0263; H01Q 3/36
(Continued)

(56) References Cited

U.S. PATENT DOCUMENTS 4,849,763 A * 7/1989 DuFort ................ H01Q 3/36
  342/372
4,931,803 A * 6/1990 Shimko ............... H01Q 3/2605
  342/371
(Continued)

FOREIGN PATENT DOCUMENTS

EP 2296006 A2 3/2011
EP 3133694 A2 * 2/2017 ............... H01Q 1/02
(Continued)

OTHER PUBLICATIONS

Foreign Communication from a Related Counterpart Application, French Search Report and Written Opinion dated Jul. 19, 2021, French Application No. 2011577 filed on Nov. 12, 2020.
(Continued)

*Primary Examiner* — Nuzhat Pervin
(74) *Attorney, Agent, or Firm* — Conley Rose, P.C.

(57) ABSTRACT

The invention relates to a MIMO imaging radar system. The system comprises transmission channels (Ve1, VeM), reception channels (Vr1, VrN), and co-located radiating elements ($ER_{e1}$, $ER_{eM}$, $ER_{r1}$, $ER_{rN}$) forming a two-dimensional antenna array. Each radiating element ($ER_{e1}$, $ER_{eM}$, $ER_{r1}$, $ER_{rN}$) has a predefined instantaneous field of coverage. Each radiating element is formed by a plurality of p radiating sub-elements (SeElt1, SsEltp) distributed in at least one of the two dimensions of the antenna array. The radar comprises a plurality of electronic steering modules ($MD_{e1}$, ..., $MD_{rN}$). Each electronic steering module is connected to one radiating element. Each steering module is configured to apply a steering command (Cmd) between all the radiating sub-elements (SeElt1, SsEltp) of a given radiating element. The steering command (Cmd) is identical from one radiating element to the next, so as to move the field of coverage of each radiating element in the same direction.

13 Claims, 7 Drawing Sheets

(51) Int. Cl.
*G01S 13/89* (2006.01)
*G01S 13/91* (2006.01)
*H01Q 3/36* (2006.01)

(58) Field of Classification Search
USPC .......................................................... 342/33
See application file for complete search history.

(56) References Cited

U.S. PATENT DOCUMENTS

| | | | | |
|---|---|---|---|---|
| 5,572,219 | A * | 11/1996 | Silverstein | H01Q 3/005 |
| | | | | 342/174 |
| 5,592,178 | A * | 1/1997 | Chang | H01Q 3/22 |
| | | | | 342/368 |
| 5,771,016 | A * | 6/1998 | Mullins | H01Q 3/2605 |
| | | | | 342/372 |
| 6,429,805 | B1 * | 8/2002 | Cornic | G01S 7/352 |
| | | | | 342/21 |
| 7,038,620 | B1 * | 5/2006 | Chubb, Jr. | H01Q 3/26 |
| | | | | 342/368 |
| 7,511,665 | B2 * | 3/2009 | Wicks | H01Q 3/22 |
| | | | | 342/25 C |
| 7,522,095 | B1 * | 4/2009 | Wasiewicz | H01Q 21/20 |
| | | | | 343/705 |
| 9,479,232 | B1 * | 10/2016 | Loui | H04B 7/0617 |
| 9,541,639 | B2 * | 1/2017 | Searcy | G01S 7/03 |
| 9,791,552 | B1 * | 10/2017 | Schuman | H01Q 3/267 |
| 9,897,695 | B2 * | 2/2018 | Vacanti | G01S 7/352 |
| 9,972,917 | B2 * | 5/2018 | Vacanti | H01Q 21/20 |
| 10,649,081 | B2 * | 5/2020 | Rincon | G01S 13/9076 |
| 10,663,563 | B2 * | 5/2020 | Schuman | G01S 7/4026 |
| 10,684,354 | B2 * | 6/2020 | Brune | H01Q 1/3233 |
| 10,950,939 | B2 * | 3/2021 | West | H01Q 3/2682 |
| 11,258,167 | B1 * | 2/2022 | Graf | H01Q 1/287 |
| 11,385,326 | B2 * | 7/2022 | Völkel | H01Q 15/0086 |
| 11,422,254 | B2 * | 8/2022 | Heo | G01S 13/42 |
| 11,424,548 | B2 * | 8/2022 | Achour | H01Q 21/005 |
| 11,444,387 | B2 * | 9/2022 | Achour | H01Q 13/28 |
| 11,502,424 | B2 * | 11/2022 | Rofougaran | H01Q 3/40 |
| 11,506,775 | B2 * | 11/2022 | Holt | H01Q 1/525 |
| 11,621,486 | B2 * | 4/2023 | Daniel | H01Q 1/38 |
| | | | | 343/770 |
| 2005/0270122 | A1 * | 12/2005 | Hyman | H01P 1/18 |
| | | | | 333/164 |
| 2007/0285314 | A1 * | 12/2007 | Mortazawi | H01Q 1/3233 |
| | | | | 343/756 |
| 2010/0066620 | A1 * | 3/2010 | Shih | H01Q 1/281 |
| | | | | 343/912 |
| 2014/0306840 | A1 * | 10/2014 | Koerber | G01S 13/422 |
| | | | | 342/107 |
| 2017/0090011 | A1 * | 3/2017 | West | G01S 13/426 |
| 2017/0127332 | A1 * | 5/2017 | Axmon | H04W 16/28 |
| 2017/0205505 | A1 * | 7/2017 | Heumphreus | H01Q 1/281 |
| 2017/0301988 | A1 * | 10/2017 | Schuman | G01S 7/4026 |
| 2018/0164407 | A1 * | 6/2018 | Schuman | G01S 13/44 |
| 2019/0260462 | A1 * | 8/2019 | Axmon | H04B 7/18506 |
| 2020/0185830 | A1 * | 6/2020 | West | H01Q 3/2682 |
| 2020/0200866 | A1 * | 6/2020 | Lynch | G01S 13/89 |
| 2020/0217943 | A1 * | 7/2020 | Pishehvari | B60W 40/105 |
| 2020/0335873 | A1 * | 10/2020 | Achour | H01Q 5/371 |
| 2021/0021028 | A1 * | 1/2021 | Karlsson | H01Q 3/2605 |
| 2021/0033700 | A1 * | 2/2021 | Loesch | G01S 7/03 |
| 2021/0096238 | A1 * | 4/2021 | Izadian | H01Q 21/0037 |
| 2021/0167518 | A1 * | 6/2021 | Achour | H01Q 21/005 |
| 2021/0274354 | A1 * | 9/2021 | Sherman | H04W 24/08 |
| 2022/0180131 | A1 * | 6/2022 | Oblak | G01S 17/931 |
| 2022/0308165 | A1 * | 9/2022 | Teague | G01S 13/872 |
| 2023/0077393 | A1 * | 3/2023 | Lee | G01S 15/86 |
| | | | | 701/24 |

FOREIGN PATENT DOCUMENTS

| | | | | |
|---|---|---|---|---|
| EP | 3301471 | A1 | 4/2018 | |
| EP | 2764575 | B1 * | 8/2018 | G01S 13/4463 |
| EP | 3499264 | B1 * | 7/2020 | G01S 13/003 |
| GB | 2556620 | A * | 6/2018 | G01S 5/06 |

OTHER PUBLICATIONS

G. A. Rankin, et al: "Radar imaging: Conventional and MIMO", Communications and Electronics (ICCE), 2012 Fourth International Conference on, IEEE, Aug. 1, 2012, pp. 171-176, XP032245515, DOI: 10.1109/CCE.2012.6315892 ISBN: 978-1-4673-2492-2.

"REVS™: A Radar-Based Enhanced Vision System for Degraded Visual Environments" (Alex Brailovsky et al. SPIE, 2014).

https://www.mathworks.com/help/phased/ug/increasing-angular-resolution-with-mimo-radars.html.

Foreign Communication from a Related Counterpart Application, English Translation of French Search Report and Written Opinion dated Jul. 19, 2021, French Application No. 2011577 filed on Nov. 12, 2020.

\* cited by examiner

MULTIPLE-INPUT MULTIPLE-OUTPUT IMAGING RADAR SYSTEM

CROSS-REFERENCE TO RELATED APPLICATIONS

The present application claims priority to French Application No. 2011577 filed with the Intellectual Property Office of France on Nov. 12, 2020, which is incorporated herein by reference in its entirety for all purposes.

The invention relates to a MIMO imaging radar system, to an aircraft comprising such a system, and to a method for controlling a MIMO imaging radar system, MIMO being the acronym of Multiple-Input Multiple-Output.

Millimeter-band imaging radars (frequency comprised between 30 and 300 GHz) today allow the image of the exterior environment of an aircraft to be produced whatever the exterior visibility conditions (poor weather conditions such as snow, rain, fog, or indeed at night) and with an angular resolution better than one degree.

Specifically, in the landing phase, it is important for the pilot to have as much real-time information as possible on the runway (size, boundaries, presence of an obstacle on the runway).

Systems allowing an image of the runway to be displayed despite a screen to visibility are known as enhanced flight vision systems (acronym EFVS).

This information is displayed to the pilot either on a screen placed in the aeroplane, or directly via the helmet of the pilot.

The angular resolution required for these systems must be far better than one degree, and their range greater than one kilometre. Moreover, in order to compensate for abrupt changes in the attitude of the aeroplane, and in particular its yaw when there are strong crosswinds (deviation of the longitudinal axis of the aeroplane), it is necessary to cover a large angular range of several tens of degrees.

Two main types of antenna are employed in EFVS, namely mechanically scanned antennas and electronically scanned antennas.

In mechanically scanned antennas, a radar beam that is fixed with respect to the antenna (sometimes designated a "pencil beam") is generated, then mechanically oriented to scan the desired field. The document "REVS™: A Radar-Based Enhanced Vision System for Degraded Visual Environments" (Alex Brailovsky et al. SPIE, 2014) presents an EFVS comprising a mechanically scanned antenna operating in the millimeter band (94 GHz).

The performance of the system presented in this article meets the requirements of an EFVS: the maximum range is three kilometres, and the angular resolution is 0.5 degrees in azimuth, and one degree in elevation (see Table 1 of the cited document).

However, this system is based on moving mechanical parts, which frequently cause problems in terms of reliability. Moreover, the repetition period of the radar (scanning period) imposes constraints in terms of the refresh rate of the radar image.

More generally, the current general tendency of aeroplane manufacturers is to avoid mechanical moving parts.

Electronically scanned antennas allow the problems in respect of reliability and refresh rate to be solved.

Phased array antennas are a first type of electronically scanned antenna. They are tiled with radiating elements fed with radio-frequency signals the relative phase shift of which is controlled. The wavefront is oriented depending on the phase gradient in the antenna array.

These antennas are able to produce a rapid scan, but they require a high number of controlled-phase radiating elements to achieve a good resolution and a large angular coverage. These phase shifts must moreover be precisely controlled in order to be able to achieve all the required pointing directions.

This requires phase shifters with a high resolution, and calibration tables allowing technological dispersion and temperature behaviour (and where appropriate frequency behaviour) to be compensated for. These phase-shift commands must moreover be very rapid, in order to rapidly cover the scanned space.

These solutions are very expensive and unsuitable for moderate-cost systems, such as EFVS, that are intended to be installed in any type of business jet or airliner.

The most commonplace alternative used to achieve an electronic scan with both a good angular resolution and a large coverage at lower cost is known by the name MIMO arrays (MIMO being the acronym of Multiple-Input Multiple-Output).

Figure 1:
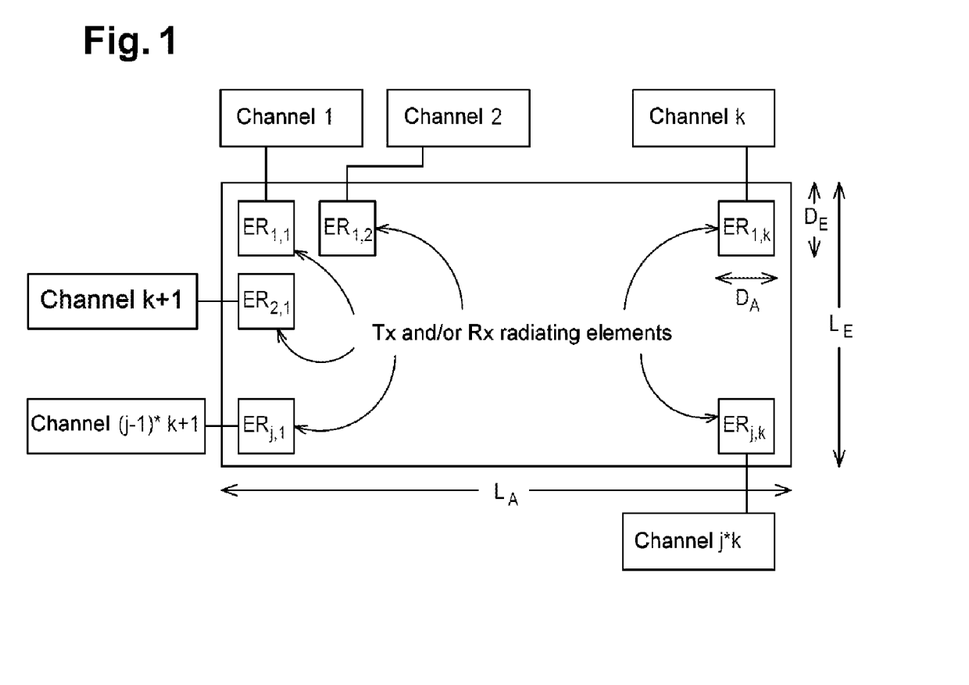
FIG. 1, which has already been described, shows a 2D antenna array used in a MIMO radar according to the prior art.

FIG. 1 schematically illustrates an example of a two-dimensional MIMO antenna array (azimuth corresponding, by convention, to the horizontal dimension and elevation corresponding to the vertical dimension).

In FIG. 1, in total j×k radiating elements (or antennas) have been illustrated. In continuous-wave mode, each of the j×k radiating elements is associated either with one transmission channel, or with one reception channel. In pulsed mode, each of the j×k radiating elements is associated with one transmission channel and with one reception channel. Among the j×k radiating elements, M are associated with one transmission channel, and N with one reception channel.

Each element has a dimension $D_A$ along the azimuthal axis, and a dimension $D_E$ along the elevation axis. The complete antenna array has a dimension $L_A$ along the azimuthal axis, and a dimension $L_E$ along the elevation axis.

It is then in the digital domain that the virtual MIMO array, made up of M×N elements, is reconstructed.

Figure 2:
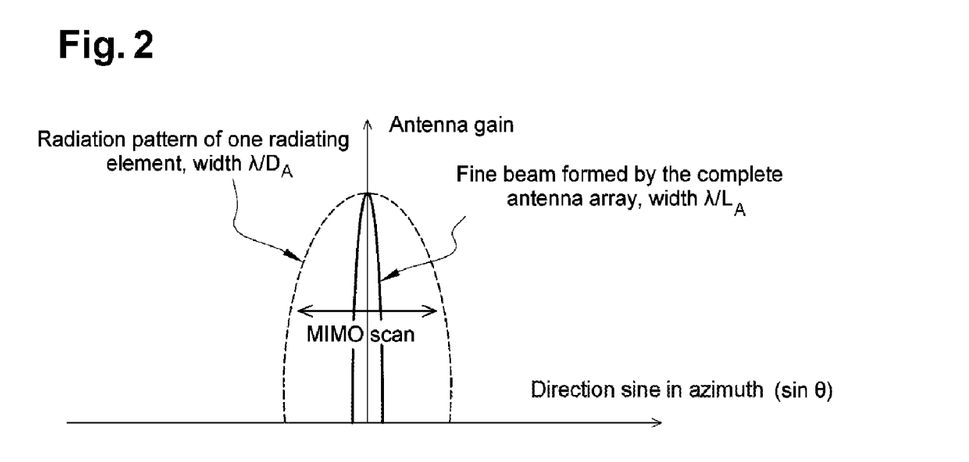
FIG. 2, which has already been described, shows the field of coverage of a radiating element, and the thin beam formed by the complete antenna, with a radar system according to the prior art.

In order to illustrate the notion of field of coverage and of angular resolution, reference may be made to FIG. 2, which illustrates the antenna gain of the beam formed by the antenna array as a function of the sine of the azimuthal angle (the same principle applies to the elevation axis).

The beam of the antenna array (solid line) has a width that corresponds to the angular resolution ($\lambda/L_A$ or $\lambda/L_E$ depending on the axis in question, where $\lambda$ corresponds to the wavelength used). The beam may move in the field of coverage, which has be shown by the dashed line.

The field of coverage is limited with respect to $\lambda/D_A$ or $\lambda/D_E$, depending on whether the azimuthal axis or elevation axis is considered.

By carefully choosing the geometry of the transmission and reception arrays, the angular resolution of the imaging radar system may be improved, without adding other radiating elements to the array. With regard to virtual networks, a person skilled in the art may, for example, refer to the document https://www.mathworks.com/help/phased/ug/increasing-angular-resolution-with-mimo-radars.html.

Thus, low-cost radars based on easily integratable on-chip components are obtained.

However, the major limitation of this type of system is due to the fact that the antenna arrays are often very highly sparse: "gaps" are intentionally created in the antenna layout (the spacing between the transmitting radiating elements is different from the spacing between the receiving radiating elements, and the spaces between the various radiating elements may be irregular and larger than the wavelength), this generating ambiguities in the radiation pattern, but these ambiguities will be removed in the digital portion.

Using a sparse antenna will simplify the computations in the digital synthesis of the channels of the virtual array, by limiting the number of channels to be processed.

Nevertheless, the sparse aspect of MIMO arrays implies a low total gain, because of the low number of transmitting radiating elements. Thus, typically, a range of about 100 metres is obtained for objects having radar cross sections (RCS) of a few $m^2$, this being insufficient for EFVS applications.

Use of a full MIMO antenna to increase power would lead to a very high number of channels to be modulated on transmission and to be digitized on reception. The digital synthesis of the channels of the virtual array will then become extremely computationally expensive and thus unachievable in airborne applications.

The invention therefore aims to provide, at moderate complexity and cost, an imaging radar that comprises no moving parts, that has a fine angular resolution and a long range, and that is able to address a large angular coverage.

One subject of the invention is therefore a multiple-input multiple-output imaging radar system, comprising:
- a plurality of transmission channels;
- a plurality of reception channels;
- a plurality of co-located radiating elements forming a two-dimensional antenna array, each radiating element being able to be fed by one of the transmission channels and/or being able to feed one of the reception channels, each radiating element having a predefined instantaneous field of coverage;

each radiating element being formed by a plurality of p radiating sub-elements distributed in at least one of the two dimensions of the antenna array, the radar comprising a plurality of electronic steering modules, each electronic steering module being connected to one radiating element, each steering module being configured to apply a steering command between all the radiating sub-elements of a given radiating element, the steering command being identical from one radiating element to the next, so as to move the field of coverage of each radiating element in the same direction.

Advantageously, each electronic steering module comprises:
- a divider or a combiner, connected to the transmission channel or to the reception channel, respectively, and
- a plurality of phase shifters, each phase shifter being connected to one of the radiating sub-elements of the radiating element.

Advantageously, each electronic steering module comprises a plurality of amplifying means, each amplifying means being connected to one radiating sub-element.

Advantageously, the steering command comprises a phase gradient applied between the various radiating sub-elements.

Advantageously, the phase gradient corresponds to a constant angular difference, selected from the following values: 0; $\pm\pi/4$, $\pm\pi/2$, $\pm 3\pi/4$; $\pm\pi$.

Advantageously, the radiating elements are placed on an antenna panel, the radiating elements occupying an area of at least 50% of the antenna panel.

Advantageously, the radiating sub-elements are placed in the azimuthal dimension and in the elevation dimension of the 2D array.

Advantageously, p=2 or 4.

Advantageously, the system comprises a calibrating table, configured to compensate, for each steering command, steering errors between the transmission channels and/or between the reception channels, produced by the electronic steering modules.

Advantageously, the system is configured to operate in the millimeter band.

Another subject of the invention is an aircraft comprising a system such as mentioned above, wherein the system comprises a computer configured to change the steering command depending on a difference between the heading and the route of the aircraft.

Advantageously, the steering command is recomputed at a frequency comprised between 10 and 15 Hz.

Another subject of the invention is a method for controlling a multiple-input multiple-output imaging radar system, the method comprising the following steps:
- transmitting a radio signal over a plurality of transmission channels;
- receiving the radar signal over a plurality of reception channels following reflection or backscatter from a target;

the transmission channels and reception channels feeding and/or being fed, respectively, by a co-located set of radiating elements forming a two-dimensional antenna array, so as to obtain a predefined instantaneous field of coverage for each of the radiating elements, each radiating element being formed by a plurality of p radiating sub-elements distributed in at least one of the two dimensions of the antenna array, the method further comprising the following step:
- applying a steering command between all the radiating sub-elements of a given radiating element, the steering command being identical from one radiating element to the next, so as to move the instantaneous field of coverage of each radiating element in the same direction.

Advantageously, the method comprises a calibrating step, in which the following sub-steps are implemented:
- measuring phase and/or amplitude errors between the field of coverage of a radiating element for a given steering command, with respect to the centre of the theoretical shifted scanning field of each radiating element;
- determining calibration coefficients depending on the measured phase and/or amplitude errors;
- storing the calibration coefficients in a table called the calibration table specific to the steering command.

Advantageously, the calibrating step is implemented for all the possible steering commands and for a plurality of ranges of values of operating temperatures.

Figure 3:
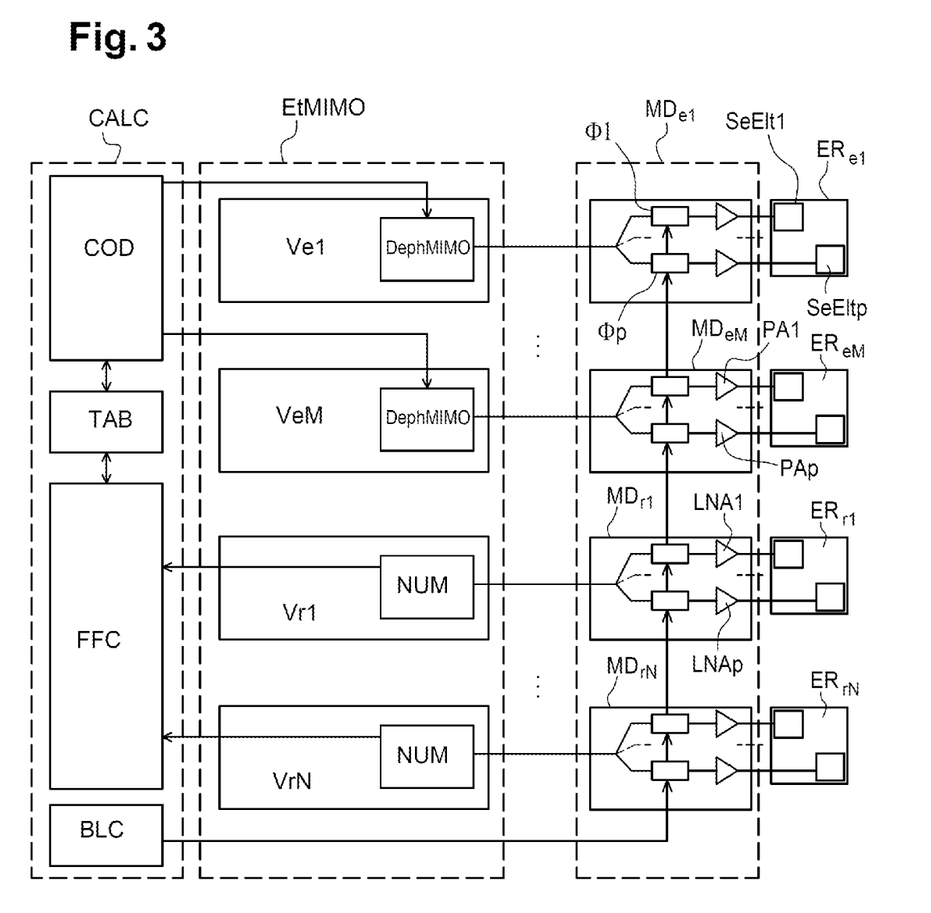
FIG. 3 shows the architecture of the radar system according to the invention, in continuous-wave mode.

Other features, details and advantages of the invention will become apparent on reading the description, which is given with reference to the appended drawings, which are given by way of example and which show, respectively:

FIG. 3 illustrates the architecture of the radar system according to the invention in continuous-wave mode. It will be recalled that in continuous-wave mode, each of the radiating elements is exclusively associated either with one transmission channel, or with one reception channel.

The radar system according to the invention comprises a MIMO stage EtMIMO, comprising a plurality of transmission channels (Ve1, ..., VeM) and a plurality of reception channels (Vr1, ..., VrN).

The radar system according to the invention comprises a plurality of radiating elements ($ER_{e1}$, $ER_{eM}$, $ER_{r1}$, $ER_{rN}$), each radiating element ($ER_{e1}$, $ER_{eM}$, $ER_{r1}$, $ER_{rN}$) being associated with one transmission channel (Ve1, ..., VeM) or one reception channel (Vr1, ..., VrN).

Each transmission channel has the feature of being able to apply an individual signature to the transmitted radar signal. There are a number of means for obtaining such a signature, for example Barker codes, DDMA coding (DDMA standing for Doppler Division Multiple Access), OFMD coding (OFMD standing for Orthogonal Frequency Division Multiplexing) which allows orthogonal frequencies to be used in the form of multiple different sub-carriers, amplitude coding or even polarization coding.

In the context of the invention, phase coding allowing orthogonality to be obtained between the transmission channels, in a burst of pulses, will in particular possibly be used. This coding is carried out by the block DephMIMO.

The phase coding of the transmission channels is controlled by a component COD for controlling the phase coding of the transmission channels. The component COD may be placed in the computer CALC of the radar system.

The reception channels (Vr1, ..., VrN) for their part have the feature of digitizing the signal received via the radiating element with which they are associated, by virtue of the block NUM present in each reception channel. A digital phase shift is applied. Next, a block FFC dedicated to computational beamforming allows the reception pattern to be formed following digital processing of the received signal.

In this way, the obtained array is a MIMO array that makes it possible to reconstruct a radar image benefiting from the angular resolution associated with the dimensions of the antenna array ($\lambda/L_A$ or $\lambda/L_E$ along the azimuthal or elevation axis), and from an instantaneous field of coverage given by the pattern of one radiating element ($\lambda/D_A$ or $\lambda/D_E$ along the azimuthal or elevation axis).

Each radiating element is subdivided into p smaller sub-elements. An electronic steering module ($MD_{e1}$, $MD_{eM}$, $MD_{r1}$, $MD_{rN}$) is inserted between each channel and the radiating element.

This module allows the signal to be divided into p paths that each undergo a controlled phase shift, and optionally a power amplification. Each of these signals then feeds one sub-element (SeElt1, SsEltp).

Figure 4:
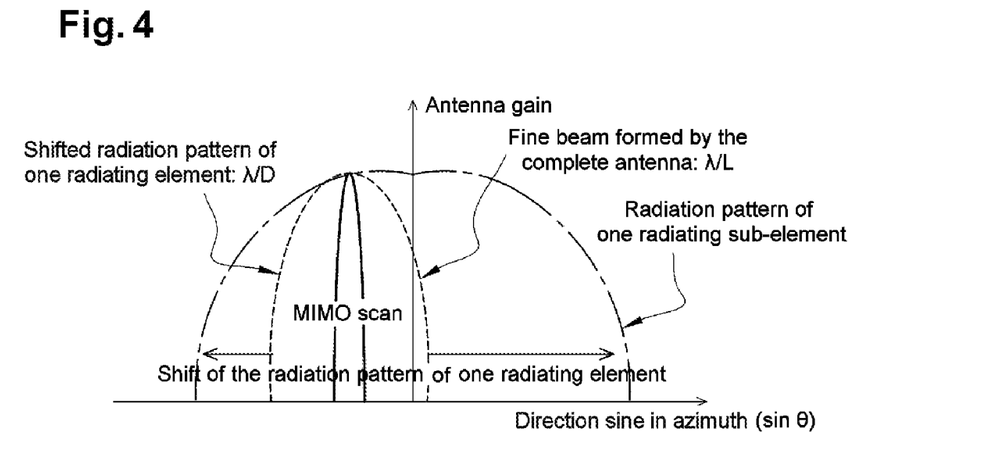
FIG. 4 shows the field of coverage of a radiating element, and the thin beam formed by the complete antenna, with a radar system according to the invention.

As may be seen in FIG. 4, the subdivision of the radiating elements into phase shiftable sub-elements therefore allows the instantaneous field of MIMO coverage to be adjusted depending on the region to be observed, without increasing the number of MIMO channels and the associated computational complexity.

The size of the accessible overall field is given by the inverse of the dimension of one radiating sub-element.

Figure 5:
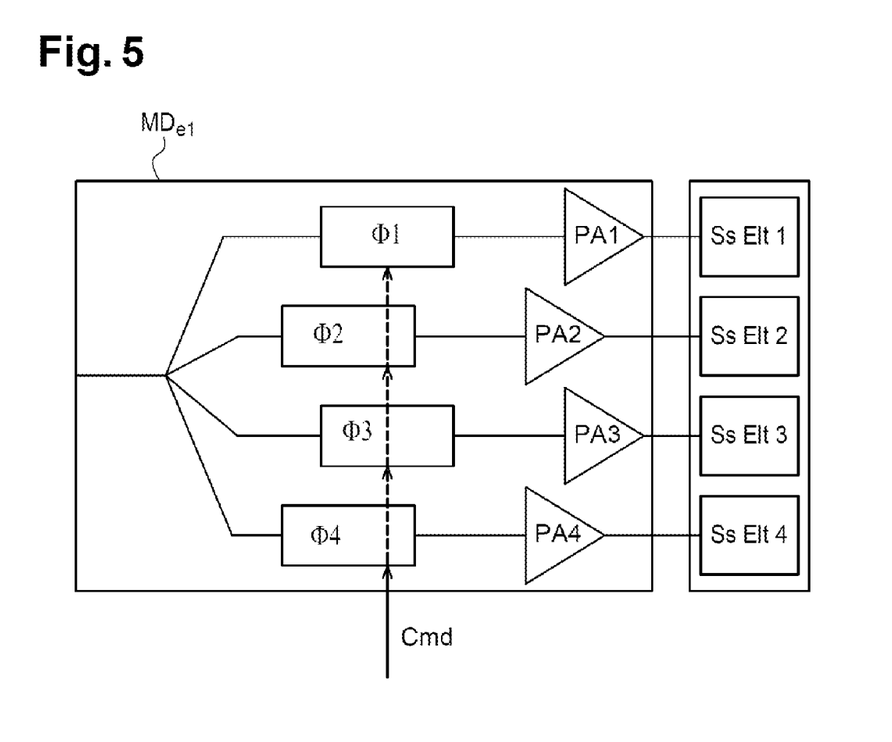
FIG. 5 shows a detailed view of the steering module according to the invention.

FIG. 5 illustrates in detail the connection between an electronic steering module and the corresponding radiating element. To simplify the representation, the radiating element has been subdivided in one dimension only.

With a subdivision of the radiating element into p sub-elements, the accessible total field is p times larger than the instantaneous field of MIMO coverage.

In the example of FIG. 5, the radiating element is subdivided into four sub-elements in the azimuth dimension (SsElt1, SsElt2, SsElt3, SsElt4). Thus, the accessible total field is four times larger than the instantaneous field of MIMO coverage.

In order for all the radiating elements of the antenna array to move their field of coverage in the same direction at the same time, it is necessary for each steering module ($MD_{e1}$, $MD_{eM}$, $MD_{r1}$, $MD_{rN}$) to apply one steering command Cmd between all the radiating sub-elements of a given radiating element, the steering command Cmd being identical from one radiating element to the next. The steering command Cmd may be transmitted over a data bus joining the steering-control block BLC to the various phase shifters.

The steering command Cmd is generated by the computer CALC of the radar system (see FIG. 3). The steering command Cmd is addressed to each steering module (for example $MD_{e1}$ in FIG. 5).

The steering module $MD_{e1}$ comprises as many phase shifters ($\varphi 1$, $\varphi 2$, $\varphi 3$, $\varphi 4$) as there are sub-elements (SsElt1, SsElt2, SsElt3, SsElt4).

Each steering module coupled to a transmission channel comprises a divider, and each steering module coupled to a reception channel comprises a combiner, in order to divide/combine the signal into p paths. These components are easily integratable into the MMIC chips targeted in the context of the invention (MMIC standing for Monolithic Microwave Integrated Circuit).

It is not necessary for the phase shifters ($\varphi 1$, $\varphi 2$, $\varphi 3$, $\varphi 4$) to have a high resolution, contrary to active phased-array antennas of AESA type, which require a very fine adjustment, phase shifter by phase shifter, with a resolution rather of about six to eight bits per phase shifter. In our example, a resolution on three bits may for example be sufficient, with a step of $+/-\pi/4$ or more ($+/-\pi/2$, or $+/-\pi$ depending on the command).

It is possible to move the unitary radiation pattern in eight different directions contained in the aperture of the radiating sub-element, by applying the commands of the table below. These commands make use of a very simple logic and a very low number of phase states, this making this solution easy to integrate.

Advantageously, a phase gradient is applied between the various constituent radiating sub-elements of each radiating element.

The value of the phase shift of the phase shifter $\varphi i$ (i comprised between 1 and 4) is denoted $\Delta\psi i$:

| Command | $\Delta\psi 1$ | $\Delta\psi 2$ | $\Delta\psi 3$ | $\Delta\psi 4$ |
|---|---|---|---|---|
| 1 | 0 | 0 | 0 | 0 |
| 2 | 0 | $\pi/4$ | $\pi/2$ | $3\pi/4$ |
| 3 | 0 | $\pi/2$ | $\pi$ | $3\pi/2$ |

-continued

| Command | Δψ1 | Δψ2 | Δψ3 | Δψ4 |
|---|---|---|---|---|
| 4 | 0 | 3π/4 | −π/2 | π/4 |
| 5 | 0 | π | 0 | π |
| 6 | 0 | −3π/4 | π/2 | −π/4 |
| 7 | 0 | −π/2 | −π | −3π/2 |
| 8 | 0 | −π/4 | −π/2 | −3π/4 |

This table corresponds to the scheme using four phase shifters. A person skilled in the art will, without difficulty, be able to adapt this schema to a different number of phase shifters.

Figure 6:
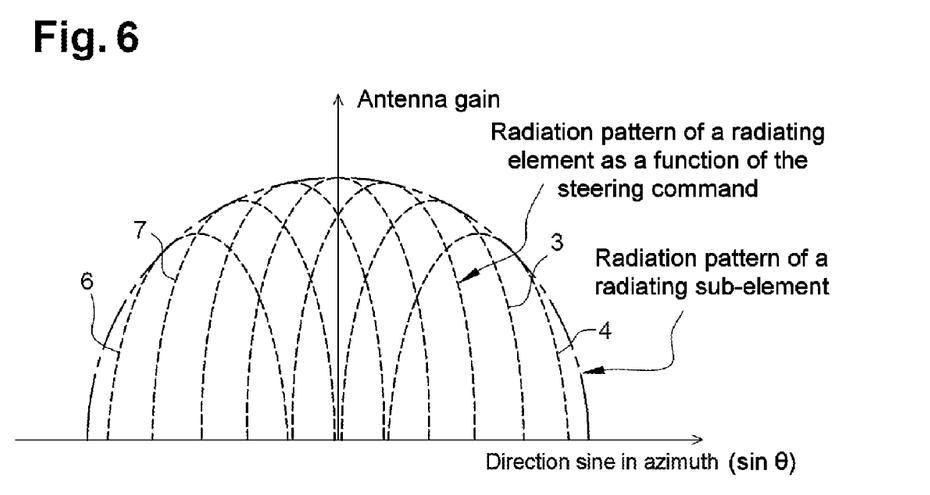
FIG. 6 shows the field of coverage of a radiating element as a function of the steering command.

FIG. 6 shows the steering of the radiation pattern of a radiating element as a function of the applied command. The field of coverage of the antenna is shown in cross section as a function of the sine of the azimuthal angle θ.

The lobe corresponding to command No. 5 has not been shown. In the phase-shifter configuration given by way of example, this command produces a half-lobe "to the right" of the lobe of command No. 4, and a half-lobe "to the left" of the lobe of command No. 6, thus forming the bridge between two patterns.

The invention thus allows the field of view of a millimetre-wave MIMO radar system to be steered, at any given time.

Figure 7A:
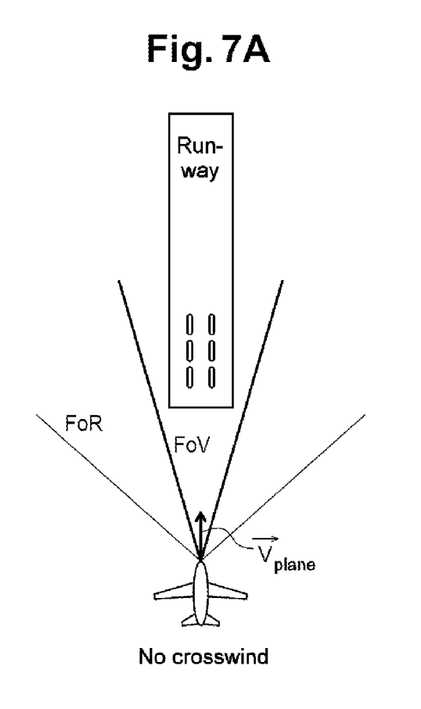
FIG. 7A shows the field of view and the field of regard in the absence of crosswind.
Figure 7B:
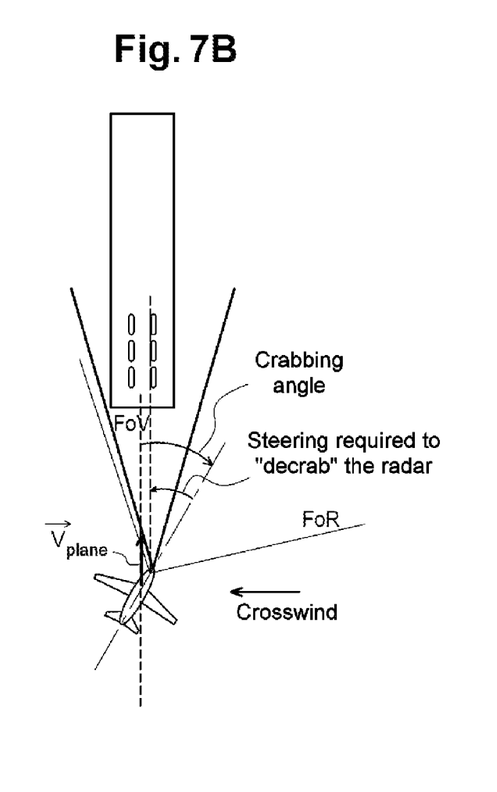
FIG. 7B shows the field of view and the field of regard in the case of crosswind, with the system according to the invention implemented.

The invention allows the field of regard (FoR) of the radar system to be broadened, as illustrated in FIGS. 7A and 7B, which illustrate a situation in absence of crosswind, and a situation in which a crosswind is present, respectively.

In FIG. 7A, in the absence of wind, the velocity vector $\overrightarrow{V_{plane}}$ of the aeroplane is correctly positioned in the field of view (FoV) of the radar. The field of regard (FoR), which corresponds to the total area that may be acquired by the sensor, is broadened by virtue of the electronic steering.

In FIG. 7B, a crosswind causes crabbing, namely causes the plane to approach the runway like a crab (i.e. sideways). With an FoV centred on the axis of the aeroplane, the radar system can no longer cover the runway.

The radar system according to the invention in contrast allows the FoV to be moved with respect to the axis of the fuselage of the aeroplane (its heading), in order to make it coincide with the velocity vector $\overrightarrow{V_{plane}}$ of the aeroplane (its route) despite the crosswind.

In order to compensate for the crabbing of the aeroplane, a refresh of the steering command at a frequency comprised between 10 and 15 Hz may be envisaged.

This frequency allows a video stream that the pilot perceives to be of good quality, on account of persistence of vision, to be obtained without however degrading the real-time performance of the radar system.

Advantageously, it is also possible to make the steering command vary cyclically, at a predetermined frequency—it is therefore possible to widen the FoR of the radar system.

The use of two or four sub-elements per radiating element (in one of the two dimensions) is particularly advantageous.

Specifically, it will be recalled that the field of coverage, namely the aperture of the lobe, of a radiating element, is given by λ/D, with D the extent of the radiating element in the dimension in question. In the millimeter band, and on account of the space usually available on the antenna panel, the aperture of the lobe, namely the field of view, is conventionally comprised between about ten and about twenty degrees for a MIMO radar.

By multiplying this value by two or by four, a field of regard (FoR) that is large enough for an EFVS application to be envisaged is thus obtained.

It will be noted that, starting with the example illustrated in FIG. 6, it is possible to add a row of radiating sub-elements, associated with phase shifters, to obtain steering in elevation. It is then possible to carry out the various steering operations along two axes, while preserving the same resolution for the phase shifters.

The elevation command then results in an additional phase shift between the rows, this again producing commands accessible with the resolution of the phase shifters.

In FIG. 3 in particular, the sub-elements from which each radiating element is composed have been shown in a 2D array, in a row and column arrangement in which the rows and columns are coincident with the azimuthal and elevation axes.

The fact of placing the radiating sub-elements in the azimuthal dimension and in the elevation dimension of the 2D array thus allows the field of coverage of each radiating element to be moved in both the azimuthal direction and the elevation direction.

However, the steering command Cmd is identical to the case where the radiating sub-elements are arranged in one direction only. The low-resolution feature of the phase shifters (for example three bits for eight phase states) is therefore preserved.

Limiting each radiating element to four sub-elements in azimuth, and four sub-elements in elevation, moreover results in an implementational constraint, in addition to the fact that the field of regard must be large enough with p=2 or p=4. Specifically, in the chips used for the millimeter band, the design of dividers or of combiners having at most 16 paths (4×4 array of sub-elements) is envisageable on account of the etchable feature thickness and of the size of the chips. Beyond, problems arise with routing the signal.

It is advantageously possible to provide amplifying means (PA1, PA2, PA3, PA4) in each electronic steering module $MD_{e1}$. Each amplifying means (PA1, PA2, PA3, PA4) is associated with one radiating sub-element (SeElt1, SsElt2, SeElt3, SsElt4).

The electronic steering module associated with a transmission channel comprises amplifying means that consist of power amplifiers (PA1, PAp), whereas the electronic steering module associated with a reception channel comprises amplifying means that consist of low-noise amplifiers (LNA1, LNAp).

Given that the number of amplifying means used in the radar system is multiplied by p, it is possible to integrate the amplifying means directly into the chip of the steering modules, in a distributed manner, without experiencing the heat-dissipation problems that would occur if a single centralized amplifying means per radiating element were integrated into the chip.

The chips conventionally used in millimeter-band amplifying means typically comprise a substrate and active elements made of silicon-germanium. Because of physical limits related to current density, these substrates are unable to withstand the heat dissipated by an integrated amplifier dimensioned so that the radar has a range of about one kilometre or more. Technologies based on gallium arsenide or even on gallium nitride could tolerate the required power, but they are expensive and incorporation of digitally controlled phase shifters is more difficult in such technologies.

This is one of the reasons why prior-art MIMO radar systems have a range of about one-hundred metres.

By virtue of the multiplication of the amplifying means, the power of the amplifying means combines in the electromagnetic field, and not on the chip. A longer range may therefore be obtained.

The on-chip integration of the amplifying means moreover allows drawbacks related to the bulk and to the high electrical power consumption of non-integrated technologies, resonant cavities for example, to be avoided.

It will be noted that reception-end, the effect is similar, and that the combination of a plurality of low-noise amplifiers (LNA) in the immediate vicinity of radiating sub-elements of small size allows upstream losses to be minimized and thus the noise factor to be decreased, this having the effect of improving the sensitivity of the radar.

The presence of the amplifying means is not essential to the obtainment of the effect used to steer the field of coverage in a given direction. This is for example the case for detection at short range.

In the context of the invention, the array of radiating elements has no need to be full or of regular pitch, but it will have the feature of being as full as possible. It is for example possible to make it so that the radiating elements occupying the antenna panel represent at least 50% of the area of the antenna panel. This constraint arises from the need to obtain a long radar range with a low bulk, especially in the airborne field.

Figure 8:
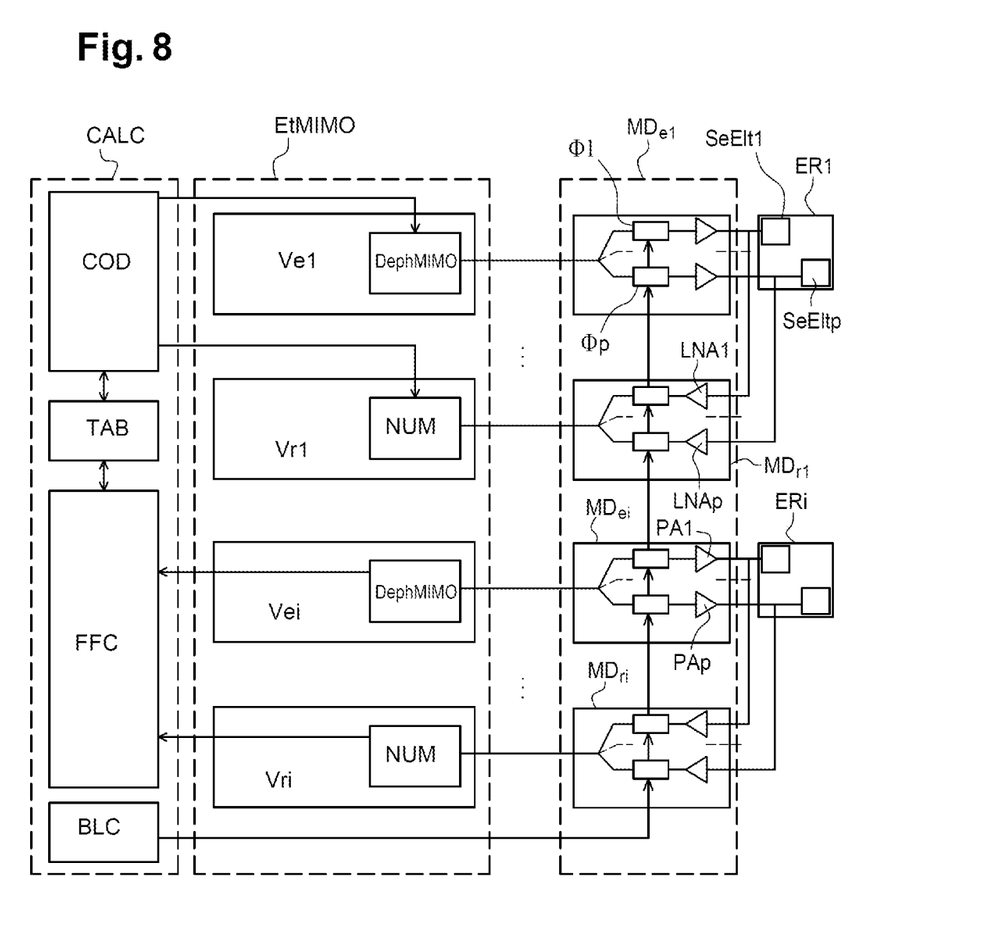
FIG. 8 shows the architecture of the radar system according to the invention, in pulsed mode.

The invention could also be implemented in pulsed-wave MIMO radar systems, in which the radiating sub-elements are connected to a transmission channel and to a reception channel, as illustrated in FIG. 8.

In FIG. 8, radiating elements ER1 to ERi have been shown. Each radiating element (ER1, ERi) may be fed by one of the transmission channels (Ve1, Vei) and may feed one of the reception channels (Vr1, Vri).

This connection of the sub-elements both to a transmission channel and to a reception channel may be achieved for example by a circulator, or by a device for protecting the reception channels when the transmission channels are active.

The invention also relates to a method for controlling the aforementioned MIMO imaging radar system.

The method advantageously comprises a step of calibrating the transmission channels and the reception channels. This step takes place prior to the operational imaging steps.

To choose phase-shift coefficients, the computer employs calibration tables TAB (illustrated in FIGS. 3 and 8) allowing the phases present on each of the transmission and reception channels to be shifted in order to correctly form the beams and to obtain a precise estimation of the absolute pointing direction of each of the beams formed.

Specifically, application of phase-shift coefficients in the electronic steering modules, which are intended to steer the field of MIMO coverage, may impair the calibration of the various channels. If these coefficients are not precise in each of the radiating sub-elements, a phase and/or amplitude error will result therefrom in each channel. The formation of the MIMO beams in the steered field is then disrupted.

In order to avoid this pitfall, the calibrating step implements the following sub-steps.

Figure 9:
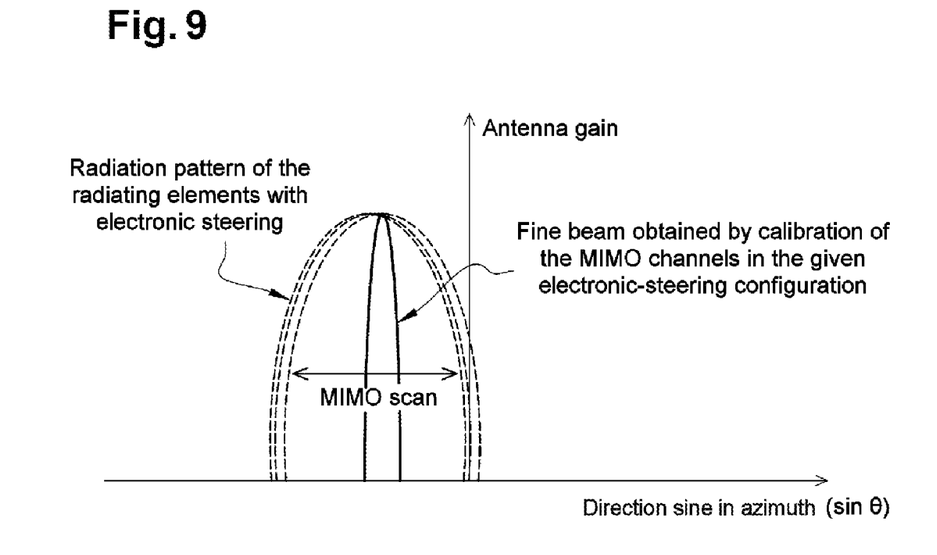
FIG. 9 shows the field of coverage of a plurality of radiating elements following the calibrating step.

As illustrated in FIG. 9, in a first sub-step, for each steering command, for example one of the eight commands of the aforementioned table, the errors between each moved radiating-element pattern are measured. This measurement corresponds to the error with respect to the centre of the theoretical shifted scanning field of each radiating element In a second sub-step, the patterns of the radiating elements are realigned with one another, by compensating for the phase and/or amplitude errors measured in the preceding sub-step, this allowing the calibration coefficients to be obtained.

These calibration coefficients are then stored in the calibration table TAB specific to the steering command Cmd in question. In FIGS. 3 and 8, a single table has been shown in the computer CALC, for the sake of simplification of figures.

This calibrating step must in particular be implemented in order to compensate for the fact that the phase shifters integrated into the chips do not comprise integrated correcting means.

The calibrating procedure is reiterated for all the possible steering commands and for a plurality of ranges of values of operating temperatures.

It is via the computer that the errors are compensated for to obtain a correctly focused antenna. From the point of view of the radiation pattern, this means that the envelope of the steered patterns of the radiating elements is able to tolerate small distortions and disparities. It is the phasing of the MIMO channels that allows the precise and re-focused formation of the fine beams to be obtained. It will be noted that, since the electronic steering modules are all identical and the phase-shift commands are also, at any given time, the expected errors are essentially common to all the modules.

The phasing of the MIMO channels occurs in any architecture of MIMO type; it is therefore not necessary to modify the computer.

The radar system according to the invention thus comprises calibration tables so as to correct the steering, in addition to temperature calibration tables, which are conventionally present in MIMO radar systems, in order to compensate for temperature drifts.

The radar system according to the invention may advantageously be located on-board an aircraft. It may be envisaged to use radar chips manufactured for motor-vehicle applications, at low cost, and to associate them with electronic steering modules produced using an ASIC in advanced integrated technology, the cost of which is also limited by the simplicity of the integrated functions (amplification, low-resolution phase shift).

The invention claimed is:

1. A multiple-input multiple-output imaging radar system, comprising:
    a plurality of transmission channels, each transmission channel being configured to apply a phase coding in such a way that orthogonality is obtained between the transmission channels in a burst of transmitted pulses;
    a plurality of reception channels;
    a plurality of co-located radiating elements forming a two-dimensional antenna array, each radiating element being able to be fed by one of the transmission channels and/or being able to feed one of the reception channels, each radiating element having a predefined instantaneous field of coverage;
    characterized in that each radiating element is formed by a plurality of p radiating sub-elements distributed in at least one of the two dimensions of the antenna array,
    the radar comprising a plurality of electronic steering modules, each electronic steering module being connected between a radiating element and one among the transmission channels or reception channels, each steering module being configured to apply a steering command between all the radiating sub-elements of a given radiating element, the steering command being identical from one radiating element to the next, so as to move the field of coverage of each radiating element in the same direction, wherein the steering command comprises a phase gradient applied between the various radiating sub-elements, said phase gradient being based on the number of sub-elements per radiating element.

2. The multiple-input multiple-output imaging radar system according to claim 1, wherein each electronic steering module comprises:
   a divider or a combiner, connected to the transmission channel or to the reception channel, respectively, and
   a plurality of phase shifters, each phase shifter being connected to one of the radiating sub-elements of the radiating element.

3. The multiple-input multiple-output imaging radar system according to claim 1, wherein each electronic steering module comprises a plurality of amplifying means, each amplifying means being connected to one radiating sub-element.

4. The multiple-input multiple-output imaging radar system according to claim 1, wherein the phase gradient corresponds to a constant angular difference, selected from the following values: $0$; $\pm\pi/4$, $\pm\pi/2$, $\pm\pi/4$; $\pm\pi$, wherein $\pi$ is a mathematical constant which is the ratio of a circle's circumference to its diameter.

5. The multiple-input multiple-output imaging radar system according to claim 1, wherein the radiating elements are placed on an antenna panel, the radiating elements occupying an area of at least 50% of the antenna panel.

6. The multiple-input multiple-output imaging radar system according to claim 1, wherein the radiating sub-elements are placed in the azimuthal dimension and in the elevation dimension of the 2D array.

7. The multiple-input multiple-output imaging radar system according to claim 1, wherein p equals 2 or 4.

8. The multiple-input multiple-output imaging radar system according to claim 1, comprising a calibration table, configured to compensate, for each steering command, steering errors between the transmission channels and/or between the reception channels, produced by the electronic steering modules.

9. The multiple-input multiple-output imaging radar system according to claim 1, configured to operate in millimeter band.

10. An aircraft, comprising the multiple-input multiple-output imaging radar system according to claim 1, wherein the system comprises a computer configured to change the steering command depending on a difference between the heading and the route of the aircraft.

11. The aircraft according to claim 10, wherein the steering command is recomputed at a rate comprised between 10 and 15 Hz.

12. Method for controlling a multiple-input multiple-output imaging radar system, the method comprising the following steps:
   transmitting a radar signal over a plurality of transmission channels each transmission channel being configured to apply a phase coding in such a way that orthogonality is obtained between the transmission channels in a burst of transmitted pulses;
   receiving the radar signal over a plurality of reception channels following reflection or backscatter from a target;
   the transmission channels and reception channels feeding and/or being fed, respectively, by a co-located set of radiating elements forming a two-dimensional antenna array, so as to obtain a predefined instantaneous field of coverage for each of the radiating elements,
   characterized in that each radiating element is formed by a plurality of p radiating sub-elements distributed in at least one of the two dimensions of the antenna array, the method further comprising the following step:
   applying a steering command between all the radiating sub-elements of a given radiating element, the steering command being applied by an electronic steering module, said electronic steering module being connected between a radiating element and one among the transmission channels or reception channels, the steering command being identical from one radiating element to the next, so as to move the instantaneous field of coverage of each radiating element in the same direction,
   wherein the steering command comprises a phase gradient applied between the various radiating sub-elements, said phase gradient being based on the number of sub-elements per radiating element.

13. The method according to claim 12, comprising a calibrating step, in which the following sub-steps are implemented:
   measuring phase and/or amplitude errors between the field of coverage of a radiating element for a given steering command, with respect to the centre of the theoretical shifted scanning field of each radiating element;
   determining calibration coefficients depending on the measured phase and/or amplitude errors;
   storing the calibration coefficients in a table called a calibration table specific to the steering command.

* * * * *

UNITED STATES PATENT AND TRADEMARK OFFICE
CERTIFICATE OF CORRECTION

| | | |
|---|---|---|
| PATENT NO. | : 12,204,012 B2 | Page 1 of 1 |
| APPLICATION NO. | : 17/525851 | |
| DATED | : January 21, 2025 | |
| INVENTOR(S) | : Yoan Veyrac et al. | |

It is certified that error appears in the above-identified patent and that said Letters Patent is hereby corrected as shown below:

In the Claims

Column 11, Claim 4, Line 21, cancel the text "The multiple-input multiple-output imaging radar system according to Claim 1, wherein the phase gradient corresponds to a constant angular difference, selected from the following values: $0; \pm \pi/4, \pm \pi/2, \pm \pi/4; + \pi$, wherein $\pi$ is a mathematical constant which is the ratio of a circle's circumference to its diameter."

Insert the following: --The multiple-input multiple-output imaging radar system according to Claim 1, wherein the phase gradient corresponds to a constant angular difference, selected from the following values: $0; \pm \pi/4, \pm \pi/2, \pm 3\pi/4; \pm \pi$, wherein $\pi$ is a mathematical constant which is the ratio of a circle's circumference to its diameter.--

Signed and Sealed this
Eleventh Day of March, 2025

Coke Morgan Stewart
*Acting Director of the United States Patent and Trademark Office*